United States Patent
Mueller et al.

(10) Patent No.: US 11,513,830 B2
(45) Date of Patent: Nov. 29, 2022

(54) INTROSPECTION INTO WORKLOADS RUNNING WITHIN VIRTUAL MACHINES

(71) Applicant: VMware, Inc., Palo Alto, CA (US)

(72) Inventors: Daniel Mueller, Palo Alto, CA (US); Abhishek Srivastava, Sunnyvale, CA (US); Adrian Drzewiecki, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 292 days.

(21) Appl. No.: 16/838,432

(22) Filed: Apr. 2, 2020

(65) Prior Publication Data
US 2021/0311757 A1    Oct. 7, 2021

(51) Int. Cl.
G06F 9/455 (2018.01)
H04L 67/02 (2022.01)
(Continued)

(52) U.S. Cl.
CPC ...... *G06F 9/45558* (2013.01); *H04L 12/4641* (2013.01); *H04L 67/02* (2013.01); *H04L 69/16* (2013.01); *G06F 2009/4557* (2013.01); *G06F 2009/45591* (2013.01); *G06F 2009/45595* (2013.01)

(58) Field of Classification Search
CPC ......... G06F 9/45558; G06F 2009/4557; G06F 2009/45591; G06F 2009/45595; H04L 12/4641; H04L 67/02; H04L 67/10; H04L 69/16; H04L 41/0226; H04L 41/0806
See application file for complete search history.

(56) References Cited

U.S. PATENT DOCUMENTS 8,521,966 B2    8/2013   Wibling et al.
2020/0104153 A1* 4/2020  Shibayama ............ G06F 3/067
(Continued)

FOREIGN PATENT DOCUMENTS

EP        3905610 A1 * 11/2021
WO   WO-2020103925 A1 *  5/2020

OTHER PUBLICATIONS

Aly, Mohab, Foutse Khomh, and Soumaya Yacout. "Kubernetes or openShift? Which technology best suits eclipse hono IoT deployments." 2018 IEEE 11th Conference on Service-Oriented Computing and Applications (SOCA). IEEE. (Year: 2018).*

(Continued)

*Primary Examiner* — John M MacIlwinen
(74) *Attorney, Agent, or Firm* — Kim & Stewart LLP

(57) ABSTRACT

Introspection into containers running in virtual machines (VMs) that are instantiated on a host computer is achieved. A method of processing an introspection command for a container, funning in a virtual machine, is carried out by a VM management process, and includes the steps of receiving a first request that is formulated according to a first protocol, e.g., transmission control protocol, and includes the introspection command, identifying the virtual machine from the first request, formulating a second request that includes the introspection command, according to a second protocol (e.g., virtual socket protocol), and transmitting the second request to a container management process running in the virtual machine for the container management process to execute the introspection command.

20 Claims, 4 Drawing Sheets

(51) Int. Cl.
*H04L 12/46* (2006.01)
*H04L 69/16* (2022.01)

(56) References Cited

U.S. PATENT DOCUMENTS

2020/0356397 A1* 11/2020 Kumatagi ............... G06F 9/455
2021/0311757 A1* 10/2021 Mueller ............. H04L 41/0226

OTHER PUBLICATIONS

Marchal, Xavier, et al. "A virtualized and monitored NDN infrastructure featuring a NDN/HTTP gateway." Proceedings of the 3rd ACM Conference on Information—Centric Networking. (Year: 2016).*
Watts, Thomas, et al. "Insight from a docker container introspection." Hawaii International Conference on System Sciences 2019. (Year: 2019).*
VMCI Sockets Programming Guide. VMware Workstation 6.5 and VMware Server 2.0 (Year: 2008).*
Viktorsson, William, Cristian Klein, and Johan Tordsson. "Security-performance trade-offs of kubernetes container runtimes." 2020 28th International Symposium on Modeling, Analysis, and Simulation of Computer and Telecommunication Systems (MASCOTS). IEEE. (Year: 2020).*
Ernst, E. et al. "Kata Containers Architecture," GitHub, Inc., 2019, 22 pages, URL: https://github.com/kata-containers/documentation/blob/master/design/architecture.md.

* cited by examiner

INTROSPECTION INTO WORKLOADS RUNNING WITHIN VIRTUAL MACHINES

BACKGROUND

Workload management software allows operators to specify workloads, e.g., software applications, that are to be run on an underlying platform. Workload management software, such as Kubernetes®, achieves a higher level of security and isolation by executing the applications in containers and managing the lifecycle of such containers as a unit known as a "pod." Kubernetes even provides the operators with abilities to debug and introspect the containers within pods, e.g., when they deviate from their expected behavior.

Typically, a peer management process runs alongside the containers to field request for introspection into the containers and execute such requests. For example, the peer management process may start another process, hook up with the container's standard input/output (STDIO) channels, or open a channel of communication into the container's TCP/IP port. In the case of Kubernetes, the peer management process is part of "kubelet," which is responsible for managing the lifecycle of pods.

SUMMARY

One or more embodiments achieve introspection into containers running in virtual machines (VMs) that are instantiated on a host computer. The system software for the host computer, which supports the execution space of the virtual machines, includes a. VM management process that is responsible for managing the lifecycle of the virtual machines in which the containers are executed. The VM management process communicates with a container management process that is running within the virtual machines to manage the lifecycle of the containers running within the virtual machines, over a communication channel established between the VM management process and each of the virtual machines, to enable introspection into containers running within the virtual machines.

A method of processing an introspection command for a container, which s running in a virtual machine, is carried out by the VM management process. The method, according to one embodiment, includes the steps of receiving a first request that is formulated according to a first protocol, e.g., TCP (transmission control protocol), and includes the introspection command, identifying the virtual machine from the first request, formulating a second request that includes the introspection command, according to a second protocol (e.g., virtual socket protocol), and transmitting the second request to a container management process running in the virtual machine for the container management process to execute the introspection command.

Further embodiments include a non-transitory computer-readable storage medium comprising instructions that cause a computer system to carry out the above methods, as well as a computer system configured to carry out the above methods.

BRIEF DESCRIPTION OF THE. DRAWINGS

DETAILED DESCRIPTION

Figure 1:
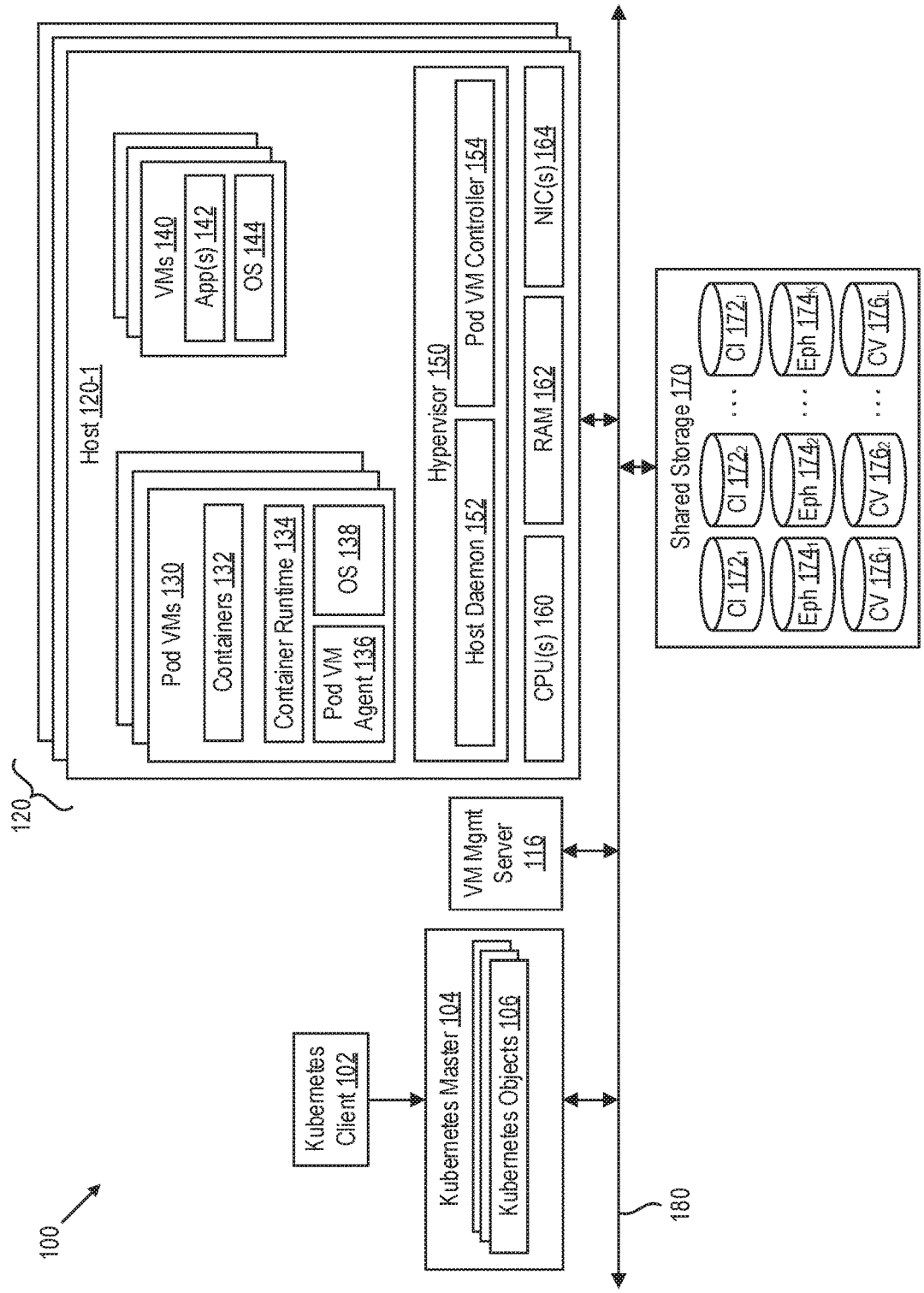
FIG. 1 is a block diagram of a clustered container host system in which embodiments may be implemented.

FIG. 1 is a block diagram of a clustered container host system 100, e.g., a Kubernetes system, in which embodiments may be implemented. System 100 includes a Cluster of hosts 120 which may be constructed on a server grade hardware platform such as an x86 architecture platform. The hardware platform includes one or more central processing units (CPUs) 160, system memory, e.g., random access memory (RAM) 162, and one or more network interface controllers (NICs) 164. A virtualization software layer, also referred to herein as a hypervisor 150, is installed on top of the hardware platform. The hypervisor supports a virtual machine execution space within which multiple VMs may be concurrently instantiated and executed. As shown in FIG. 1, the VMs that are concurrently instantiated and executed in host 120-1 include pod VMs 130, which also function as Kubernetes pods, and VMs 140. In addition, all of hosts 120 are configured in a similar manner as host 120-1 and they will not be separately described herein.

In the embodiment illustrated by FIG. 1, hosts 120 access shared storage 170 by using their NICs 164 to connect to a network 180. In another embodiment, each host 120 contains a host bus adapter (I-WA) through which input/output operations (IOs) are sent to shared storage 170. Shared storage 170 may comprise, e.g., magnetic disks or flash memory in a storage area network (SAN). In some embodiments, hosts 120 also contain local storage devices (e.g., hard disk drives or solid-state drives), which may be aggregated and provisioned as a virtual SAN device.

VM management server 116 is a physical or virtual server that communicates with host daemon 152 running in hypervisor 150 to provision pod VMs 130 and VMs 140 from the hardware resources of hosts 120 and shared storage 170. VM management server 116 logically groups hosts 120 into a cluster to provide cluster-level functions to hosts 120, such as load balancing across hosts 120 by performing VM migration between hosts 120, distributed power management, dynamic VM placement according to affinity and anti-affinity rules, and high-availability. The number of hosts 120 in the cluster may be one or many. Each host 120 in the cluster has access to shared storage 170 via network 180. VM management server 116 also communicates with shared storage 170 via network 180 to perform control operations thereon.

Kubernetes master 104 is a physical or virtual server that manages Kubernetes objects 106. Kubernetes client 102 represents an input interface for an application administrator or developer (hereinafter referred to as the "user"). It is commonly referred to as kubect1 in a Kubernetes system. Through Kubernetes client 102 the user submits desired states of the Kubernetes system, e.g., as YAML files, to Kubernetes master 104. In response, Kuhernetes master 104 schedules pods onto (i.e., assigns them to) different hosts 120 (which are also nodes of a Kubernetes cluster in the embodiments), and updates the status of Kubernetes objects 106. The pod VM controllers of the different hosts 120 periodically poll Kubernetes master 104 to see if any of the pods that have been scheduled to the node (in this example, the host) under its management, and execute tasks to bring the actual state of the pods to the desired state as further described below.

Hypervisor 150 includes a host daemon 152 and a pod VM controller 154. As described above, host daemon 152 communicates with VM management server 116 to instantiate pod VMs 130 and VMs 140. Pod VM controller 154 manages the lifecycle of pod VMs 130 and determines when to spin up or delete a pod VM 130.

Each pod VM 130 has one or more containers 132 running therein in an execution space managed by container runtime 134. The lifecycle of containers 132 is managed by pod VM agent 136 (more generally referred to as the "container management process"). Both container runtime 134 and pod VM agent 136 run on top of an operating system (OS) 136. Each VM 140, which is not a pod VM, has applications 142 running therein on top of an OS 144.

Each of containers 132 has a corresponding container image (CI) stored as a read-only virtual disk in shared storage 170. These read-only virtual disks are referred to herein as CI disks and depicted in FIG. 1 as CI $172_{1-J}$. Additionally, each pod VM 130 has a virtual disk provisioned in shared storage 170 for reads and writes. These read-write virtual disks are referred to herein as ephemeral disks and are depicted in FIG. 1 as Eph $174_{1-K}$. When a pod VM is deleted, its ephemeral disk is also deleted. In some embodiments, ephemeral disks can be stored on a local storage of a host because they are not shared by different hosts. Container volumes are used to preserve the state of containers beyond their lifetimes. Container volumes are stored in virtual disks depicted in FIG. 1 as CV $176_{1-L}$.

In the embodiments illustrated herein, "namespaces" are created and used to divide resources, e.g., pod VMs, between multiple users. For example, a pod VM A in a namespace of one user may be authorized to use a CI X that is registered to that user. On the other hand, a pod VM B in a namespace of a different user may not be authorized to use CI X.

In the embodiments, a hypervisor-VM channel is used to enable communication between pod VM controller 154 and all of pod VMs 130 that are managed by pod VM controller 154. One example of hypervisor-VM channel is virtual machine communication interface (VMCI), which is a high-speed interface that VMs on the same host use to communicate with each other and the host's kernel modules. The VMCI circumvents the network layer and it allows applications to work when network access is restricted or unavailable. One example implementation of VMCI is described in U.S. Pat. No. 8,521,966, the entire contents of which are incorporated by reference herein. Communication over the hypervisor-VM channel is governed by the so-called virtual sockets protocol, which is a socket protocol commonly available in kernels of hypervisors.

In clustered container host system 100, containers 132 run workloads for an application within pod VMs 130 in the execution space managed by container runtime 134. When containers 132 are spun up, pod VM agent 136 of pod VM 130 in which containers 132 are running opens an HTTP based channel and listens for introspection commands that hypervisor 150 (in particular, pod VM controller 154) transmits on that channel. When an introspection command for a target container is received by pod VM controller 154, pod VM controller 154 determines the pod VM hosting the target container and forwards the introspection command to pod VM agent 136 for pod VM agent 136 to process the introspection command.

Figure 2:
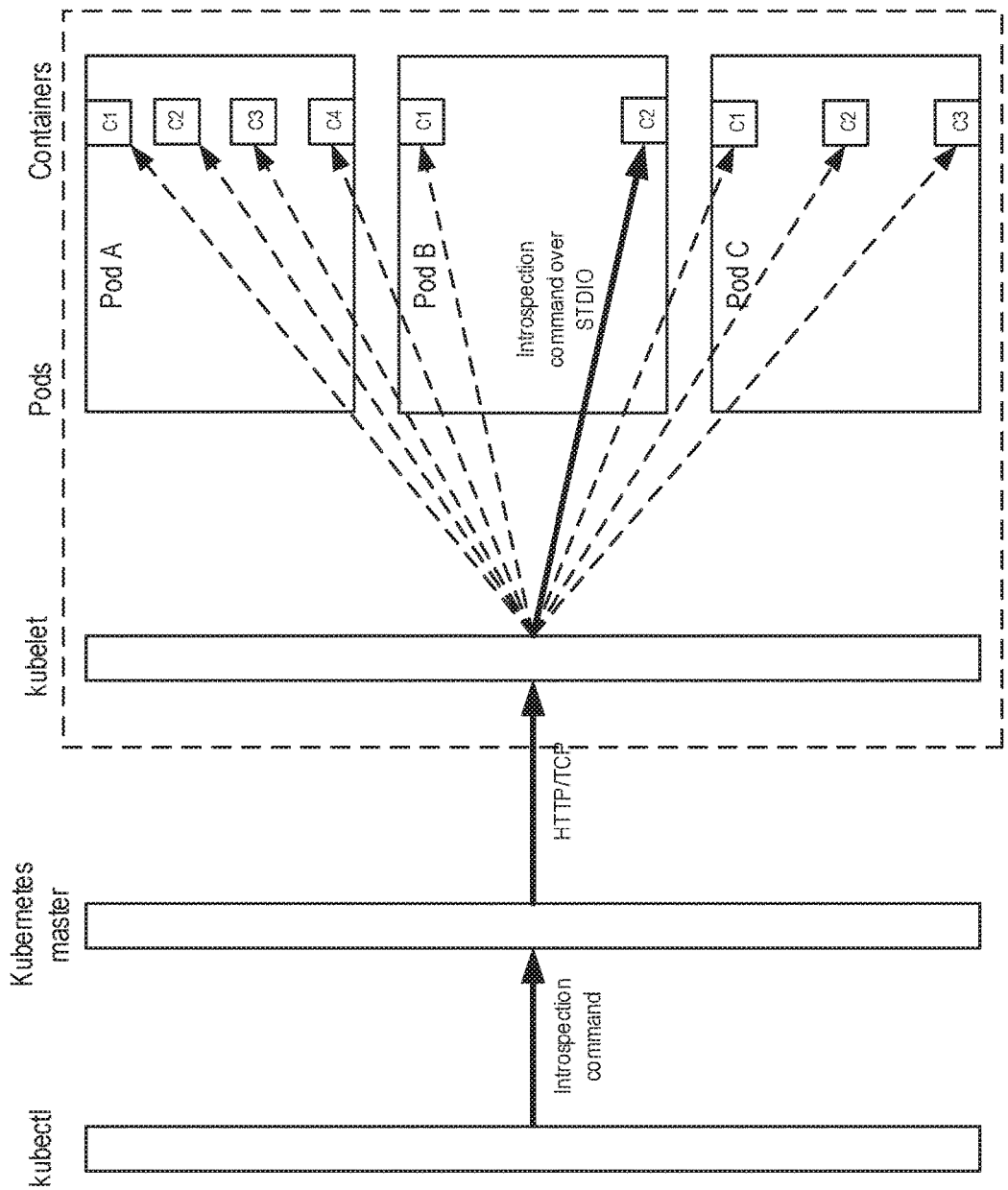
FIG. 2 is a conceptual diagram illustrating a flow of commands that are issued between components of a prior art clustered container host system to achieve introspection of containers.

FIG. 2 is a conceptual diagram illustrating a flow of commands that are issued between components of a prior art Kubernetes system to achieve introspection of containers. The prior art Kubernetes system includes kubect1, which is a command line interface to a Kubernetes API server, depicted in FIG. 2 as "Kubernetes master." Each node of the Kubernetes system includes a kubelet, which manages the lifecycle of pods and containers within the pods according to desired states published by the Kubernetes master. To achieve introspection, the kubelet on each node opens an HTTP based channel and listens for introspection commands that the Kubernetes master transmits on that channel. In response, the kubelet determines which container in which pod is the target of the introspection command and forwards the introspection command over standard input-output channels to the target container. In the example illustrated in FIG. 2, the target container is container C2 running in pod B.

Figure 3:
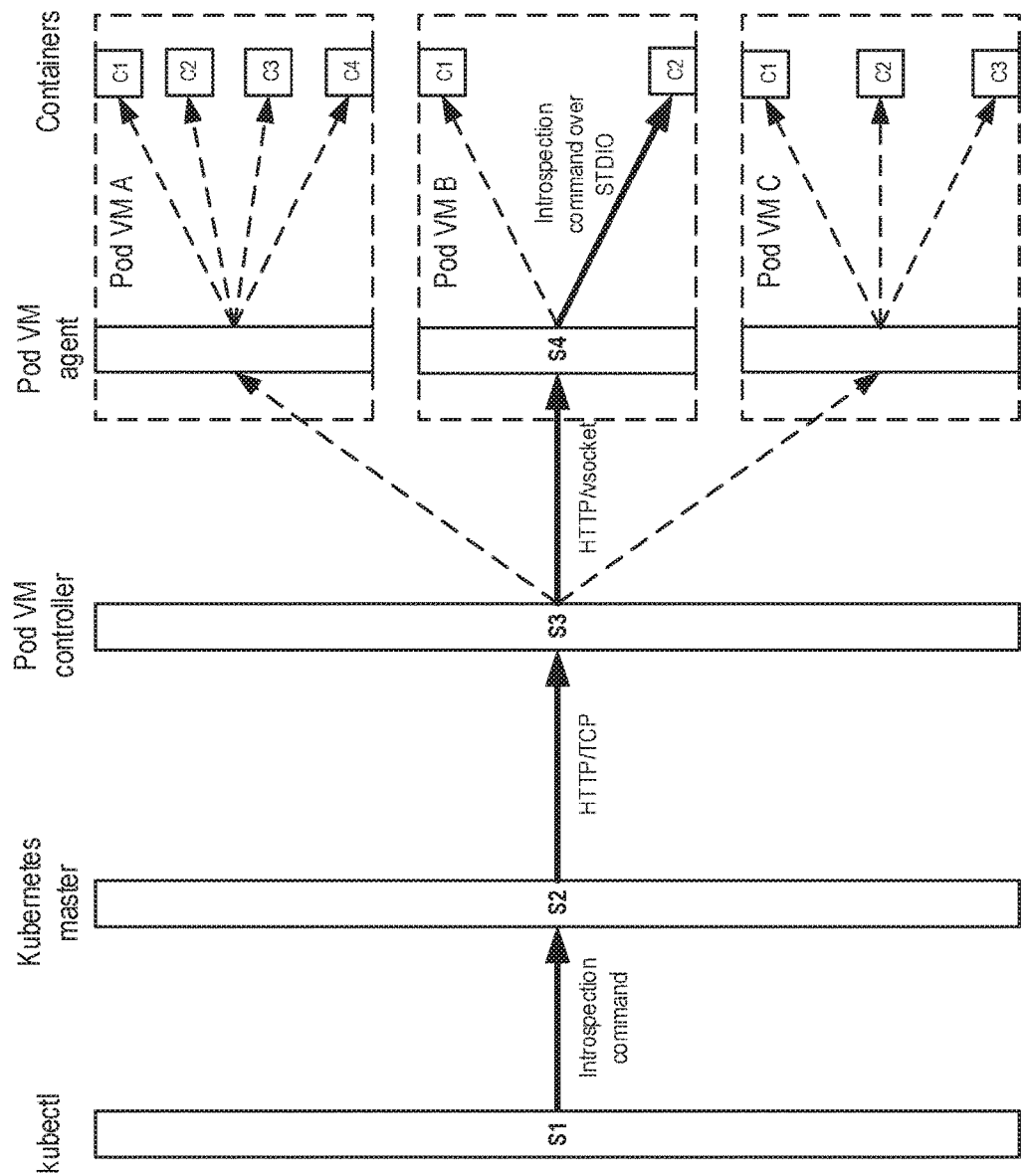
FIG. 3 is a conceptual diagram illustrating a flow of commands that are issued between components of the clustered container host system of FIG. 1 to execute introspection commands according to an embodiment.

FIG. 3 is a conceptual diagram illustrating a flow of commands that are issued between components of the clustered container host system of FIG. 1 to execute introspection commands according to an embodiment. In the embodiment of FIG. 3, the example of clustered container host system 100 is a Kubernetes system, and so, an introspection command is entered through the kubect1 command line interface at step S1 and processed by Kubernetes master 104 at step S2. The introspection command generally has the following format: kubect1 command name pod_name container_name. Examples of command_names include "exec" to execute a command inside the target container while the target container is running, "attach" to hook up to standard input-output channels of the target container while the target container is running, and "port-forward" to establish a bidirectional communication channel with the target container while the target container is running.

Kubernetes master 104 formulates the introspection command as an HTTP request in accordance with a protocol of the communication channel that it established with each of the nodes of the Kubernetes system. In the embodiments, each node of the Kubernetes system is a host 120 and the protocol of the communication channel is TCP. Kubernetes master 104 forwards the HTTP request to the node on which the pod VM, pod_name, is running. Then, at step S3, the pod VM controller of that node (e.g., pod VM controller 154) parses the HTTP request to identify the target pod VM specified in the HTTP request. It then reformulates the HTTP request in accordance with a virtual socket protocol and transmits the reformulated HTTP request over VMCI to the target pod VM. At step S4, the container management process (e.g., pod VM agent 136) running in the target pod VM parses HTTP request to identify the target container specified in the request and executes the introspection command on the target container. As noted above, examples of introspection commands include "exec" to execute a command inside the target container while the target container is running, "attach" to hook up to standard input-output channels of the target container while the target container is running, and "port-forward" to establish a bidirectional communication channel with the target container while the target container is running.

Figure 4:
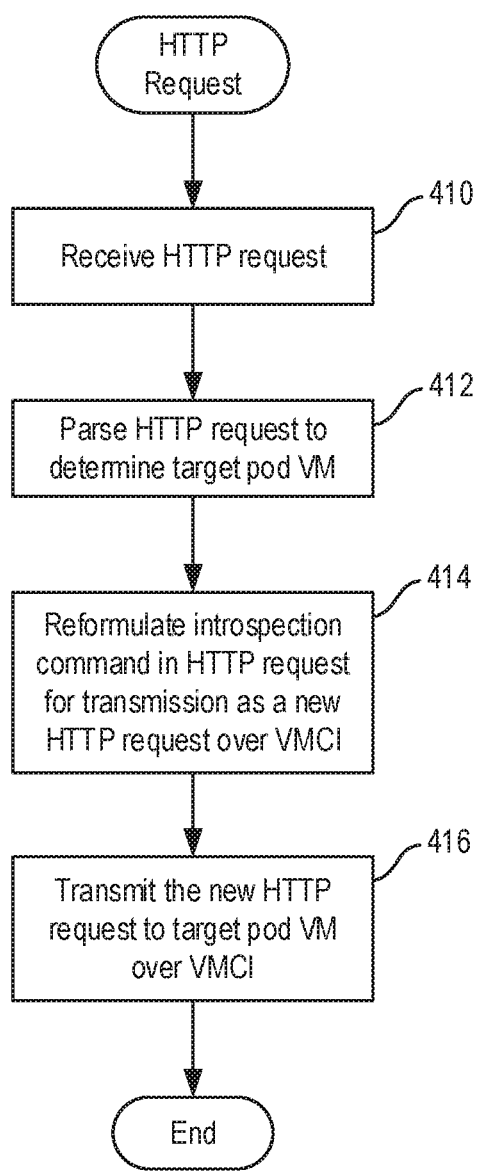
FIG. 4 is a flow diagram illustrating steps of a method carried out by a VM management process to relay an introspection command in an HTTP request to a target VM identified in the HTTP request.

FIG. 4 is a flow diagram illustrating steps of a method carried out by a VM management process to relay an introspection command in an HTTP request to a target pod VM identified in the HTTP request. The steps depicted in FIG. 4 corresponds to steps carried out by the VM management process executing step S3 of FIG. 3.

The method of FIG. 4 begins at step 410 upon receipt of an HTTP request by a node (e.g., host 120) of the Kubernetes system. Then, at step 412, the pod VM controller of that node (e.g., pod VM controller 154) parses the HTTP request to identify the target pod VM specified in the HTTP request. The pod VM controller at step 414 reformulates the HTTP request in accordance with a virtual socket protocol and at step 416 transmits the reformulated HTTP request over VMCI to the target pod VM.

Figure 5:
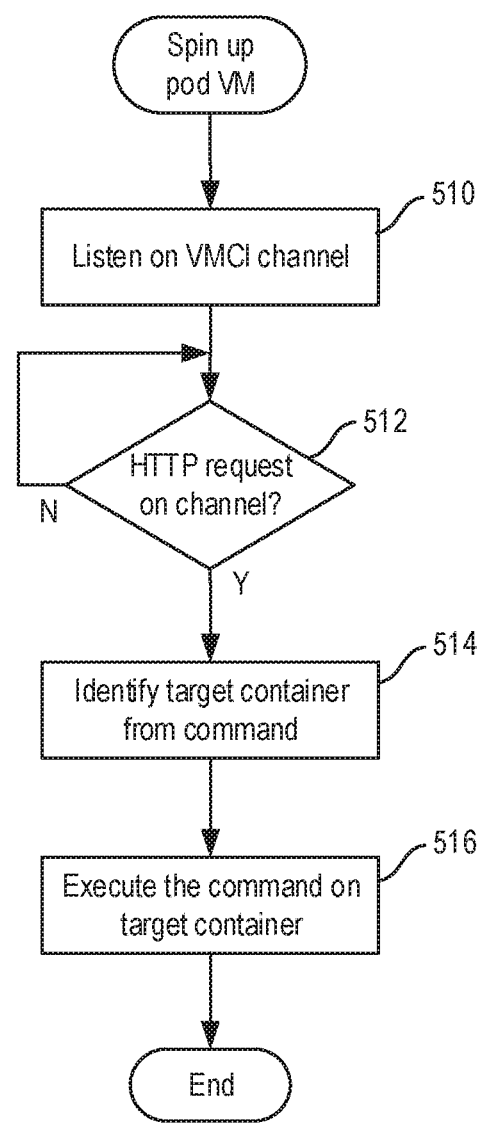
FIG. 5 is a flow diagram illustrating steps of a method carried out by a container management process in the target VM to execute the introspection command.

FIG. 5 is a flow diagram illustrating steps of a method carried out by a container management process in the target pod VM to execute the introspection command. The steps depicted in FIG. 4 corresponds to steps carried out by the VM management process executing step S4 of FIG. 3.

The method of FIG. 5 is carried out by a pod VM agent and is executed when a pod VM is spun up. The pod VM agent at step 510 begins listening on the VMCI channel established between the pod VM controller and the pod VM, and at step 512 determines if an HTTP request has been transmitted on that VMCI channel. If so, the pod VM agent at step 514 parses the HTTP request to identify the target container specified in the request, and at step 516 executes the introspection command on the target container.

In one embodiment, an introspection command executed on the target container launches a process that opens a port which can be accessed by a browser running in an operator's workstation alongside Kubernetes client 102 to view and monitor the state of target container. In another embodiment, an introspection command executed on the target container attaches the standard input-output of the operator's workstation to the target container so that standard output and standard error streams of the target container output to the operator's workstation and inputs into the target container can be made through the operator's workstation.

In further embodiments, an introspection on the target container may be carried out using port forwarding. Port forwarding is used to tunnel traffic between a local port at the operator's workstation and a specific port of a specific pod VM. The general format of the port forwarding command is: kubectl port-forward pod_name local-port:container-port. Kubernetes master 104, upon receipt of this command from the kubectl command line interface, formulates it as an HTTP request, and transmits the HTTP request to the node on which the pod VM, pod_name, is running. The pod VM controller of that node parses the HTTP request to identify the pod VM specified in the HTTP request. It then reformulates the HTTP request in accordance with virtual socket protocol and transmits the reformulated HTTP request over the VMCI channel to the target pod VM. The pod VM agent running in the target pod VM then parses the HTTP request to map the local port at the operator's workstation to the port of the pod VM assigned to the target container. Thereafter, the operator merely needs to open a browser on his or her workstation and type in http://localhost: local-port to access the target container at the "container-port" to perform testing, validation, and debugging thereon.

Clustered container host system 100 has been described herein as a Kubernetes system. However, the Kubernetes system is merely one embodiment of clustered container host system 100. Clustered container host systems according to other embodiments may be managed by any other workload management software that enables one or more containers to be run inside VMs.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of processing an introspection command for a container running in a virtual machine, wherein the virtual machine is one of a plurality of virtual machines running in a host computer, each of the virtual machines having one or more containers running in a container execution space managed by a container runtime of the virtual machine, said method comprising:
receiving a first request that is formulated according to a first protocol and includes the introspection command;
parsing the first request to identify a target virtual machine specified in the first request;
formulating a second request, that includes the introspection command, according to a second protocol; and
transmitting the second request to the target virtual machine for a container management process running in the target virtual machine to execute the introspection command.

2. The method of claim 1, wherein
the container management process and the container runtime of the target virtual machine run on top of a guest operating system of the target virtual machine,
the host computer has a virtual machine (VM) management process running therein, and the VM management process has a communication channel established with each of the virtual machines, and
the VM management process transmits the second request to the target virtual machine over the communication channel established with the virtual machine.

3. The method of claim 2, wherein the first protocol is TCP (transmission control protocol) and the second protocol is virtual socket protocol.

4. The method of claim 3, wherein the first request is an HTTP (hypertext transfer protocol) request and the second request is an HTTP request.

5. The method of claim 1, wherein the introspection command is a command to execute a command inside the container while the container is running.

6. The method of claim 1, wherein the introspection command is a command to hook up to standard input-output channels of the container while the container is running.

7. The method of claim 1, wherein the introspection command is a command to establish a bidirectional communication channel with the container while the container is running.

8. The method of claim 7, wherein the command to establish the bidirectional communication channel is a port-forwarding command that maps a local port to a port on the virtual machine.

9. A non-transitory computer readable medium comprising instructions that are executable on a processor to cause the processor to carry out a method of processing an introspection command for a container running in a virtual machine, wherein the virtual machine is one of a plurality of virtual machines running in a host computer, each of the virtual machines having one or more containers running in a container execution space managed by a container runtime of the virtual machine, and said method comprises the steps of:
receiving a first request that is formulated according to a first protocol and includes the introspection command;
parsing the first request to identify a target virtual machine specified in the first request;
formulating a second request, that includes the introspection command, according to a second protocol; and
transmitting the second request to the target virtual machine for a container management process running in the target virtual machine to execute the introspection command.

10. The non-transitory computer readable medium of claim 9, wherein
the container management process and the container runtime of the target virtual machine run on top of a guest operating system of the target virtual machine,
the host computer has a virtual machine (VM) management process running therein, and the VM management process has a communication channel established with each of the virtual machines, and
the VM management process transmits the second request to the target virtual machine over the communication channel established with the virtual machine.

11. The non-transitory computer readable medium of claim 10, wherein the first protocol is TCP (transmission control protocol) and the second protocol is virtual socket protocol.

12. The non-transitory computer readable medium of claim 11, wherein the first request is an HTTP (hypertext transfer protocol) request and the second request is an HTTP request.

13. The non-transitory computer readable medium of claim 9, wherein the introspection command is a command to execute a command inside the container while the container is running.

14. The non-transitory computer readable medium of claim 9, wherein the introspection command is a command to hook up to standard input-output channels of the container while the container is running.

15. The non-transitory computer readable medium of claim 9, wherein the introspection command is a command to establish a bidirectional communication channel with the container while the container is running.

16. The non-transitory computer readable medium of claim 15, wherein the command to establish the bidirectional communication channel is a port-forwarding command that maps a local port to a port on the virtual machine.

17. A host computer in which a virtual machine (VM) management process and a plurality of virtual machines are running, wherein each of the virtual machines has one or more containers running in a container execution space managed by a container runtime of the virtual machine, and the VM management process executes the steps of:
receiving a first request that is formulated according to a first protocol and includes an introspection command for a container running in a target virtual machine, which is one of the plurality of virtual machines;
parsing the first request to identify the target virtual machine specified in the first request;
formulating a second request, that includes the introspection command, according to a second protocol; and transmitting the second request to the target virtual machine for a container management process running in the target virtual machine to execute the introspection command.

18. The host computer of claim 17, wherein
the container management process and the container runtime of the target virtual machine run on top of a guest operating system of the target virtual machine,
the VM management process has a communication channel established with each of the virtual machines, and
the VM management process transmits the second request to the target virtual machine over the communication channel established with the virtual machine.

19. The host computer of claim 17, wherein the first protocol is TCP (transmission control protocol) and the second protocol is virtual socket protocol.

20. The host computer of claim 19, wherein the first request is an HTTP (hypertext transfer protocol) request and the second request is an HTTP request.

\* \* \* \* \*